United States Patent
Brandwein et al.

[11] 3,906,437
[45] Sept. 16, 1975

[54] DEVICE FOR MONITORING THE OPERATING PARAMETERS OF A DYNAMIC SYSTEM

[75] Inventors: Rowland Brandwein; Mohan Gupta, both of Shawnee Mission, Kans.

[73] Assignee: Textron, Inc., Providence, R.I.

[22] Filed: Sept. 7, 1973

[21] Appl. No.: 395,185

[52] U.S. Cl. .............. 340/27; 73/117.3; 235/150.2; 340/183
[51] Int. Cl. ..................... G01m 15/00; G08g 5/00
[58] Field of Search ........... 340/27, 177 R, 177 CA, 340/179, 182, 183, 213 Q; 235/150.2, 151.3; 73/116, 117.3

[56] References Cited
UNITED STATES PATENTS

| | | | |
|---|---|---|---|
| 3,525,075 | 8/1970 | Frome et al. | 340/182 X |
| 3,541,537 | 11/1970 | Kasson | 340/179 |
| 3,626,398 | 12/1971 | Owens, Jr. et al. | 340/183 |
| 3,641,530 | 2/1972 | Schoenwitz | 340/213 Q |
| 3,665,399 | 5/1972 | Zehr et al. | 340/152 R |
| 3,665,439 | 5/1972 | Brummer et al. | 340/27 R |
| 3,750,465 | 8/1973 | Howell et al. | 235/150.2 X |

OTHER PUBLICATIONS

S. J. Dipaolo, "Unique Computer System Monitors Aircraft Engines," Electronics, Vol. 36, No. 2, 01-1-1-1963, pp. 38–41, TK 7800 E58.

*Primary Examiner*—Donald J. Yusko
*Attorney, Agent, or Firm*—Pennie & Edmonds

[57] ABSTRACT

The device for monitoring the operating parameters of a dynamic system (for example, an aircraft having an internal combustion engine power plant) comprises a plurality of sensors each one of which is adapted to measure the magnitude of a specific operating parameter and to generate a sensor signal voltage that varies directly with the magnitude of the operating parameter. The sensor signal voltage generated by each sensor is transformed to a conditioned and calibrated analog signal voltage the magnitude of which is in the same proportion to a predetermined reference voltage as the actual magnitude of the operating parameter being measured is to a predetermined reference magnitude of the operating parameters. The conditioned analog signal voltage gradient is divided into a predetermined number incrementally increasing analog signal voltage increments, and analog signal voltage increment indicator means are provided for visually indicating the analog signal increment that corresponds to the actual magnitude of the operating parameter being measured. Selector switch means are provided for selecting the conditioned analog signal that corresponds to a particular one of the operating parameters being measured. The selected conditioned analog signal is converted to a corresponding multibit digital signal which is transmitted to an array of alpha-numeric visual display units which display in numeric form the actual magnitude of the particular operating parameter being measured.

13 Claims, 11 Drawing Figures

DEVICE FOR MONITORING THE OPERATING PARAMETERS OF A DYNAMIC SYSTEM

BACKGROUND OF THE INVENTION

1. Field of the Invention

This invention relates to a device for monitoring the operating parameters of a dynamic system such as an aircraft power plant.

2. Prior Art

The term "dynamic system" as employed herein refers to such integrated operational entities as a petroleum refinery, a chemical processing or manufacturing plant, a steam generating plant, prime movers of all descriptions and, in particular, an aircraft having an internal combustion engine power plant and associated equipment. All of these dynamic systems share in common the characteristic of having a large number of operating parameters (for example, temperatures, pressures, fluid flow rates, voltages and the like) the magnitude of which must be continuously monitored in order to successfully control the operation of the system. In order to monitor the operating parameters of such systems, sensors (for example, thermocouples and the like) are provided for measuring the magnitude of each parameter in which the operator is interested, and the magnitude of each such parameter is displayed or recorded by instruments located at a central system control station. The transmission of sensor signals to the control station and the efficient display at the control station of the data thus transmitted present engineering and design problems which are not always easily or successfully overcome.

The problem of displaying the measured magnitudes of a variety of essential operating parameters conveniently and efficiently at a central control station is exemplified in the case of aircraft where this data must be displayed on the already crowded instrument panel in the cockpit within ready view of the pilot. By way of example, Federal Aviation Regulations require that in a fixed pitch propellered airplane the following operating parameters must be displayed to the pilot for each engine: engine speed (Rpm); engine oil temperature; engine oil pressure; fuel pressure; and ammeter function. In addition Federal Aviation Regulations require that the fuel supply level and the air pressure or vacuum for operating flight instruments be displayed to the pilot, and further that the manifold pressure be displayed in constant speed propellered airplane. The instruments for displaying the aforementioned operating parameters are mounted in standard instrument openings formed in the instrument panel and, taken altogether, occupy a great deal of the limited space available at the panel.

After an intensive investigation of the problems involved in the transmission and display of data relating to essential operating parameters, as exemplified by those discussed above in connection with aircraft, we have now devised a unique device for monitoring the parameters of such systems which requires very little space, which provides redundant data presentation capability, which eliminates the need for fluid lines leading to the display panel, and which possesses other important advantages which will hereinafter appear.

SUMMARY OF THE INVENTION

The device we have devised for monitoring the operating parameters of a dynamic system comprises a plurality of sensors each one of which is adapted to measure the magnitude of a specific operating parameter and to generate a sensor signal voltage that varies directly with the magnitude of the operating parameter being measured. The sensor signal voltage generated by each sensor is transmitted to a sensor signal voltage conditioning and calibrating means which transforms the sensor signal voltage to a conditioned analog signal voltage the magnitude of which is in the same proportion to a predetermined reference voltage as the actual magnitude of the operating parameter being measured is to a predetermined reference magnitude of said operating parameter. The conditioned analog signal voltage corresponding to each sensor signal voltage is transmitted to a continuous to incremental voltage gradient converter means which is adapted to divide the continuous voltage gradient of the conditioned analog signal voltage into a predetermined number of incrementally increasing analog signal voltage increments, whereby the actual signal voltage from said signal voltage conditioning and calibrating means is converted to an analog signal voltage increment the magnitude of which corresponds approximately to the actual magnitude of the operating parameter being measured. Analog signal voltage increment indicator means are electrically connected to the continuous to incremental voltage gradient converter means, said indicator means having an electrically energized visual display means that corresponds to each of said predetermined analog signal voltage increments, said visual display means visually indicating the analog signal voltage increment that corresponds to the actual magnitude of the operating parameter being measured. Selector switch means are also electrically connected to each of the signal voltage conditioning and calibrating means, said selector switch being adapted to select the conditioned analog signal from a particular one of the signal conditioning and calibrating means and to transmit said selected signal to an analog to digital converter means. The analog to digital converter means converts the selected conditioned analog signal voltage to a corresponding multibit digital signal that is transmitted to a first array of alpha-numeric visual display units, said display units displaying in numeric form the actual magnitude of the particular operating parameter that corresponds to the particular conditioned analog signal selected by said selector switch means.

Additional sensors may be provided for measuring the magnitude of additional operating parameters. The sensor signal voltage generated by certain of these additional sensors is conditioned and calibrated as previously described, and the resulting conditioned analog signal voltage is transmitted directly to a continuous voltage gradient to incremental voltage gradient converter means and thence to an analog signal voltage increment indicator means, and also to an analog to digital converter means and thence to a second array of alpha-numeric visual display units. The sensor signal voltage generated by others of the additional sensors is transmitted to a sensor signal voltage conditioning and calibrating means, the resulting conditioned analog signal voltage then being transmitted to a visual signal light that is illuminated when the signal voltage reaches a predetermined value. In addition, an audible alarm may be provided when the conditioned analog signal voltage corresponding to the actual magnitude of any of the operating parameters being measured falls below or exceeds a predetermined value.

BRIEF DESCRIPTION OF THE DRAWING

The monitoring device of the invention will be better understood from the following description thereof in conjunction with the accompanying drawings of which.

DESCRIPTION OF A PREFERRED EMBODIMENT

Figure 1:
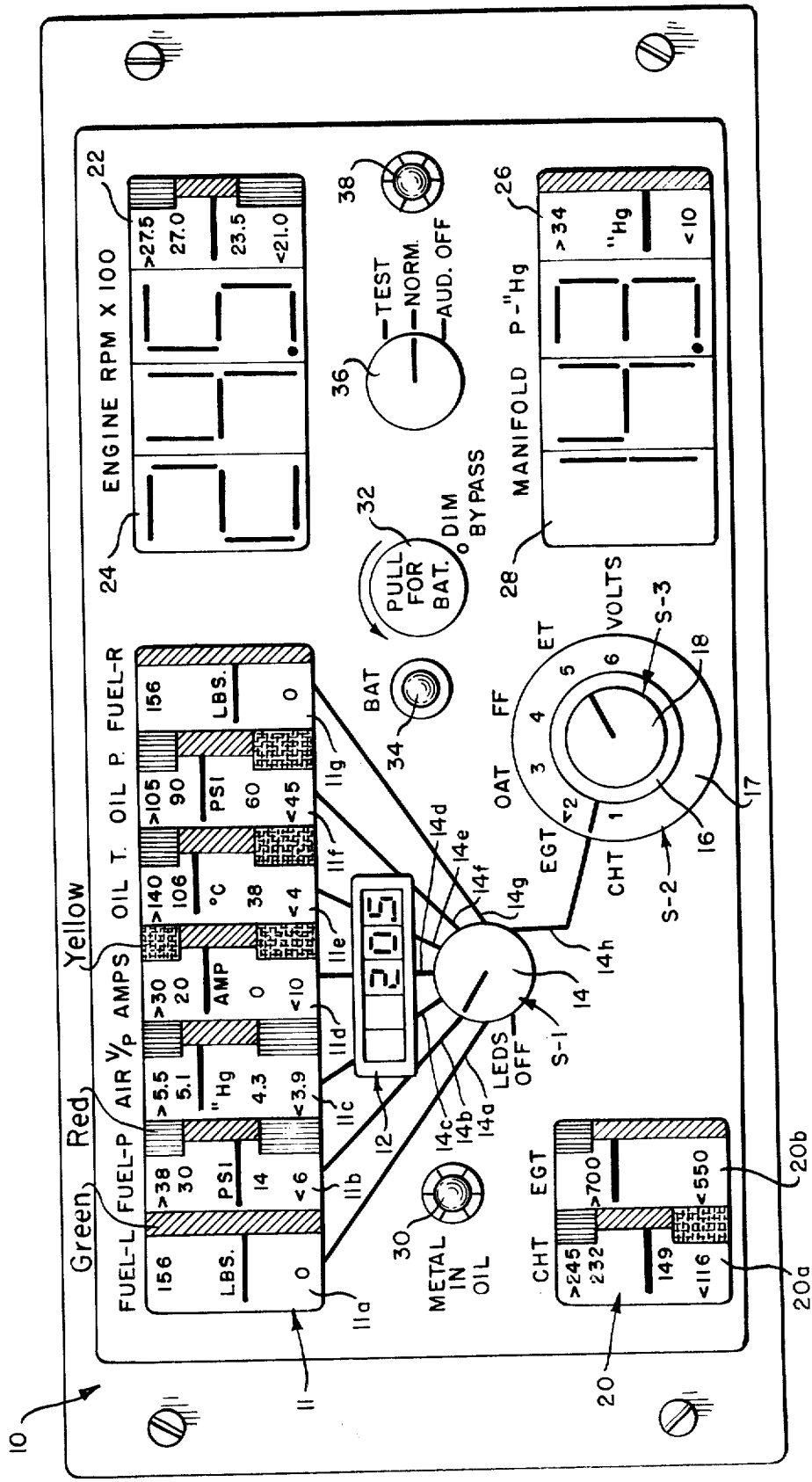
FIG. 1 is a front elevation of an advantageous embodiment of the visual display and control panel of the device.

As hereinbefore mentioned, the term "dynamic system" as employed in the present specification and claims refers to such integrated assemblages of machinery and/or material processing and handling equipment as are exemplified by, but not limited to, petroleum refineries, chemical manufacturing plants, steam and electric generating plants, and the like. All of these dynamic systems share in common the characteristic of having a large number of operating parameters (for example, temperatures, pressures, fluid flow rates, voltages and the like) the magnitude of which must be continuously monitored in order to successfully control the operation of the system. Stated briefly, the dynamic system monitoring device is provided with a plurality of sensors each one of which is adapted to measure the magnitude of a specific operating parameter of the system and to generate a sensor signal voltage that varies directly with the magnitude of the operating parameter being measured. The sensor signal voltage from each sensor is "conditioned" as hereinafter described, and the conditioned signal voltage is transmitted to analog signal visual display means which display in analog form the approximate value of all of the operating parameters being measured. The conditioned signal voltage is also optionally transmitted to an array of alpha-numeric units which display in numeric form the precise value of the operating parameter being measured. In the interests of simplicity and clarity, the embodiment of the system monitoring device described in detail herein is specifically adapted to monitor the essential operating parameters of an aircraft having an internal combustion engine power plant. However, as will be apparent, the embodiment of the device described herein can readily be modified in non-essential respects to monitor other dynamic systems of the type hereinbefore referred to.

In aircraft having a constant speed propeller, Federal Aviation Regulations require that the following operating parameters be displayed to the pilot: the fuel supply level or quantity of fuel remaining in all fuel tanks; the air pressure or vacuum for operating flight instruments; the engine speed (rpm) of each engine; the engine oil temperature for each engine; the engine oil pressure for each engine; the pressure of the fuel being delivered to each engine; the amperes being discharged or charged by the electrical system associated with each engine; and the intake manifold pressure of each engine. In addition to the aforesaid "mandatory" aircraft and power plant operating parameters, the following "optional" operating parameters are also advantageously displayed to the pilot: the cylinder head temperature of at least one and preferably all of the cylinders of the engine; the exhaust gas temperature of at least one and preferably all of the cylinders of the engine; the outside air temperature; the rate of fuel flow to the engine; the voltage of the electrical system of the engine; and the elapsed time from the start of or from some selected point in the flight of the aircraft. The embodiment of the system monitoring device described herein is adapted to monitor all of the aforesaid "mandatory" and "optional" aircraft and power plant operating parameters and to visually display the measured values of these parameters to the pilot. Other operating parameters such as the presence of metal in the engine oil may also be monitored and an appropriate visual display means provided by the device. In addition, an audible alarm may be provided which sounds when the magnitude of any of the operating parameters being measured falls below or exceeds a predetermined value.

Referring now to FIG. 1 of the drawing, the monitoring device of the invention has a compact control and data display panel 10 that is designed to fit in a standard instrument opening (about 3 by 6 inches) in the instrument panel of the aircraft. The externally visible components of the panel 10 include a group of seven separate analog signal visual display means 11 for visually indicating the approximate value of each of seven mandatory aircraft operating parameters - namely: the fuel remaining in the left fuel tank (display 11a labeled Fuel-L); the pressure of the fuel being delivered to the engine (display 11b labeled Fuel-P); instrument air pressure (display 11c labeled Air V/P); ammeter function (display 11d labeled Amps); engine oil temperature (display 11e labeled Oil-T); engine oil pressure (display 11f labeled Oil-P); and the fuel remaining in the right fuel tank (display 11g labeled Fuel-R). A first array of five integrated alpha-numeric visual display units 12 is provided for indicating in numeric form the precise value of any particular one of said seven mandatory aircraft operating parameters, and also any particular one of six optional aircraft operating parameters selected by the pilot. A first selector switch S-1 having a switch knob 14 rotatable to nine positions is provided for selecting the particular mandatory operating parameter to be displayed by the display units 12 and also for permitting said optional operating parameters to be displayed by the display units 12 as hereinafter described.

A second selector switch S-2 having a switch knob 16 rotatable to six positions is provided for selecting the particular one of the six optional operating parameters to be displayed by the numeric display units 12 - namely: the cylinder head temperature (CHT); exhaust gas temperature (EGT); outside air temperature (OAT); the rate of fuel flow (FF); elapsed time (ET); and the voltage of the electrical system (Volts). A third selector switch S-3 having a switch knob 18 also rotatable to six positions and concentrically mounted within the knob 16 is provided for selecting one of the six cylinders of the engine for display by the numeric display units 12 of the cylinder head or the exhaust gas temperature of that cylinder. A group of two separate analog signal visual display means 20 is provided for indicating the approximate value of the cylinder head temperature (display 20a labeled CHT) and the approximate value of the exhaust gas temperature (display 20b labeled EGT) from each of one selected cylinder.

The visible components of the panel 10 also include an analog signal visual display means 22 for indicating the approximate speed of the aircraft engine, and a second array 24 of three integrated alpha-numeric visual display units for displaying in numeric form the precise value of the engine speed. Similarly an analog signal visual display means 26 is provided for indicating the approximate value of the intake manifold pressure, and a third array of three integrated alpha-numeric visual display units 28 is provided for indicating in numeric form the precise value of the intake manifold pressure of the engine.

A visual signal light 30 is provided which is illuminated when metal is detected in the engine oil. A panel illumination dimmer control 32 is provided for controlling the back lighting and illumination of the visual displays. A battery condition test light 34 is provided for testing the condition of the emergency battery, the battery test light being activated by pulling the dimmer control 32 outwardly. A three-position selector switch 36 is provided for placing the monitoring device in its normal operating mode (as shown), for turning off the audible alarm while otherwise maintaining the device in its normal operating mode, and for testing the internal circuitry of the device when the aircraft engine is not running. A test light 38 is illuminated when the device is placed in its test mode by the switch 36 to indicate the proper functioning of the device.

In the embodiment of the monitoring device shown in FIG. 1, the analog signal visual display means (that is, display means 11, 20, 22 and 26) are so-called "10-bar indicators" which are available from commercial electronic suppliers. A 10-bar indicator comprises an integrated group of ten horizontally disposed rod-like light sources which are positioned one above another to provide a vertical array or stack of the horizontal light sources. The 10-bar indicator is designed to operate within a predetermined range of indicator control voltages. At the lowest control voltage within the predetermined range the lowermost of the horizontal light sources in the vertical stack is illuminated; at a mid-range control voltage one of the middle (say, the 5th) horizontal light source is illuminated; and at the highest control voltage within the predetermined range the uppermost horizontal light source is illuminated. The analog signal voltage range or gradient corresponding to the minimum and maximum values of a particular operating parameter being monitored is "conditioned" to fall within the predetermined operating range of the 10-bar indicator. The conditioned analog voltage gradient is then divided into 10 increments, each voltage increment being of the specific control voltage value that will cause one of the horizontal light sources to be illuminated. Thus, as the conditioned analog signal voltage corresponding to the operating parameter being measured increases incrementally from a predetermined minimum voltage to a predetermined maximum voltage, the horizontal light sources of the 10-bar indicator will be illuminated one at a time starting with the lowermost horizontal light source and progressing upwardly to the uppermost horizontal light source as the analog signal voltage increases. By proper calibration of the analog signal voltage and the 10-bar indicator, the position of the illuminated horizontal light source of the 10-bar indicator provides a reliable indication of the approximate value of the operating parameter being measured.

With respect to certain operating parameters that must be maintained within a specified range of magnitude for safe operation of the aircraft, it is necessary to color code the 10-bar indicator so that the pilot can ascertain at a glance whether any particular operating parameter is within the safe (green) range of magnitude, or whether the operating parameter has risen above or fallen below the safe range and is in a cautionary (yellow) or danger (red) range. Audible alarm means are also provided which sound when any of the operating parameters being measured fall below or exceed its safe (green) range of magnitude.

Other types of analog signal visual display means may be employed in place of the aforementioned 10-bar indicators. One such analog signal display means are the so-called "tri-lights" which are also available from commercial electronic suppliers. A tri-light comprises three separate incandescent filaments within a single glass envelope each filament being masked by a color filter - namely, a red filter, a yellow filter and a green filter. The analog signal voltage corresponding to a particular operating parameter being monitored is conditioned, and the conditioned signal voltage is being divided into a predetermined number of analog signal voltage increments as previously described. The analog signal voltage increments corresponding to operating parameter magnitudes falling within the safe range of operation will cause the green filtered filament of the tri-light to be illuminated. Similarly, analog signal voltage increments corresponding to operating parameter magnitudes that fall below or exceed the safe operating range will cause the yellow filtered or the red filtered filament of the tri-light to be illuminated, as may be appropriate to the specific circumstances.

The arrays of integrated alpha-numeric visual display units (that is, the arrays of the display units 12, 24 and 28) are advantageously comprised of light emmitting diodes (LEDS) which are available from commercial electronic suppliers. Other types of alpha-numeric display units that may be used include liquid crystals of the light reflective or light transmissive type, fiber optic readouts, and incandescent readouts all of which are available from commercial electronic suppliers.

The nine-position selector switch S-1 and the concentrically mounted six-position selector switches S-2 and S-3 are of conventional design and may be obtained from commercial sources. With reference to the concentrically mounted selector switches S-2 and S-3, the symbols (CHT, etc.) marking the six selectable positions of the knob 16 of the selector switch S-2 and the numerals (1–6) marking the six selectable positions of the knob 18 of the selector switch S-3 are painted or printed on the face plate of the display panel 10. The knob 16 is provided with a flange 17 of transparent material which extends over the numerals (1–6) and through which the numerals are visible. The transparent flange 17 is marked with an arrowhead (shown pointing to the symbol EGT) which indicates the selectable position to which the knob 16 has been rotated. The knob 18 of the selector switch S-3 is marked with a pointer line (shown pointing to numeral 5) which indicates the selectable position to which the knob 18 has been rotated. The visual signal lights 30, 34 and 38, the dimmer control 32 and the selector switch 36 are conventional components and may be obtained from commercial sources.

The organization and interrelationship of the various functional components of the device which sense the magnitude of the various operating parameters being monitored and which transmit data relating to these parameters to the display panel 10 are shown in FIGS. 2 through 11 of the drawings. Solid state components are used throughout the device, the solid state sensors being located at the site of the parameter being measured and being connected to the signal conditioning, multiplexing and display components by electrical wiring so that no fluid-containing lines are required to extend from the power plant to the instrument panel of the aircraft. The parameter monitoring sensors are all of known design and may be obtained from commercial suppliers of such equipment. Similarly, the various functional components referred to in the drawings as signal conditioning and calibration units, analog increment converter units, analog to digital converter units, crystal reference, analog display and the like are of known design and may be obtained from commercial sources or may be assembled from basic electronic components by any competent electronic technician who knows the intended function of the unit. It is the organization and interrelationship of these known functional components into the system monitoring device described herein that comprises our unique contribution to the art.

Figure 2:
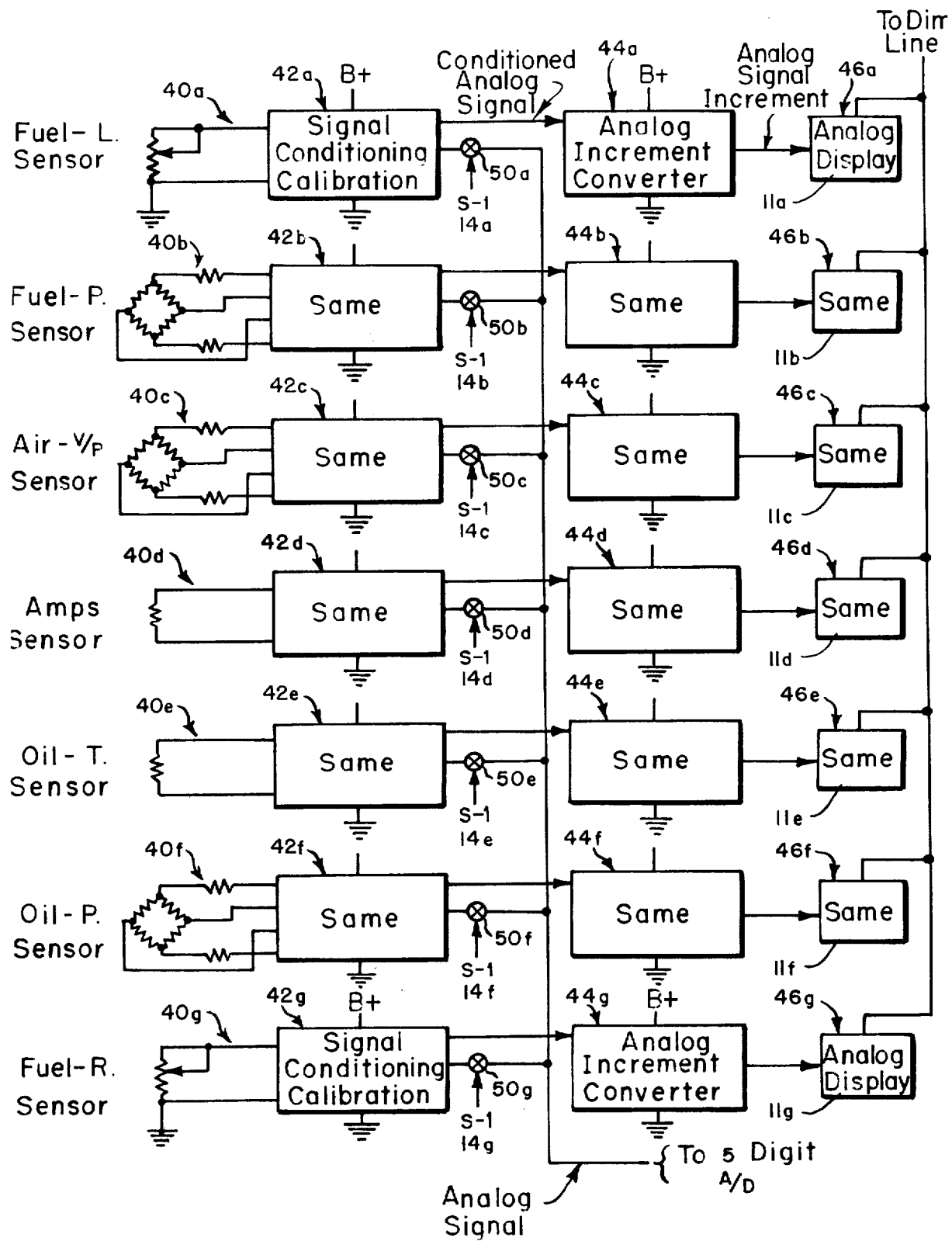
FIGS. 2 through 11 are block diagrams of the various functional components of the device showing how these components are electrically interconnected as hereinafter described.
Figure 7:
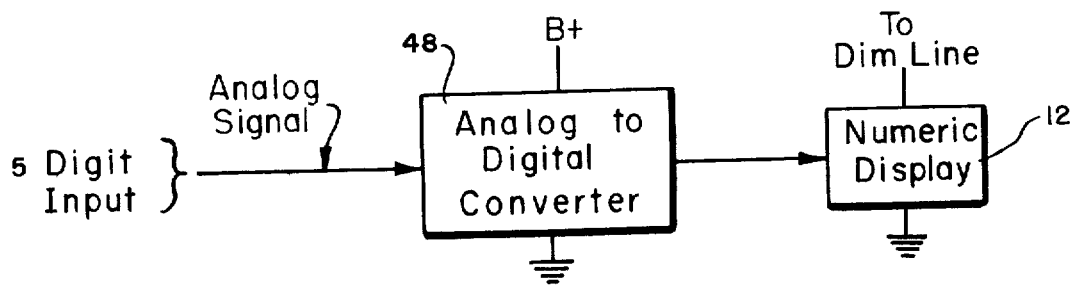
Figure 10:
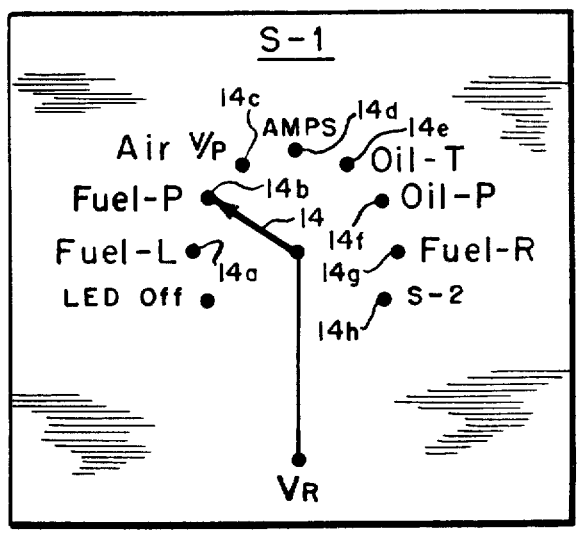
Figure 11:
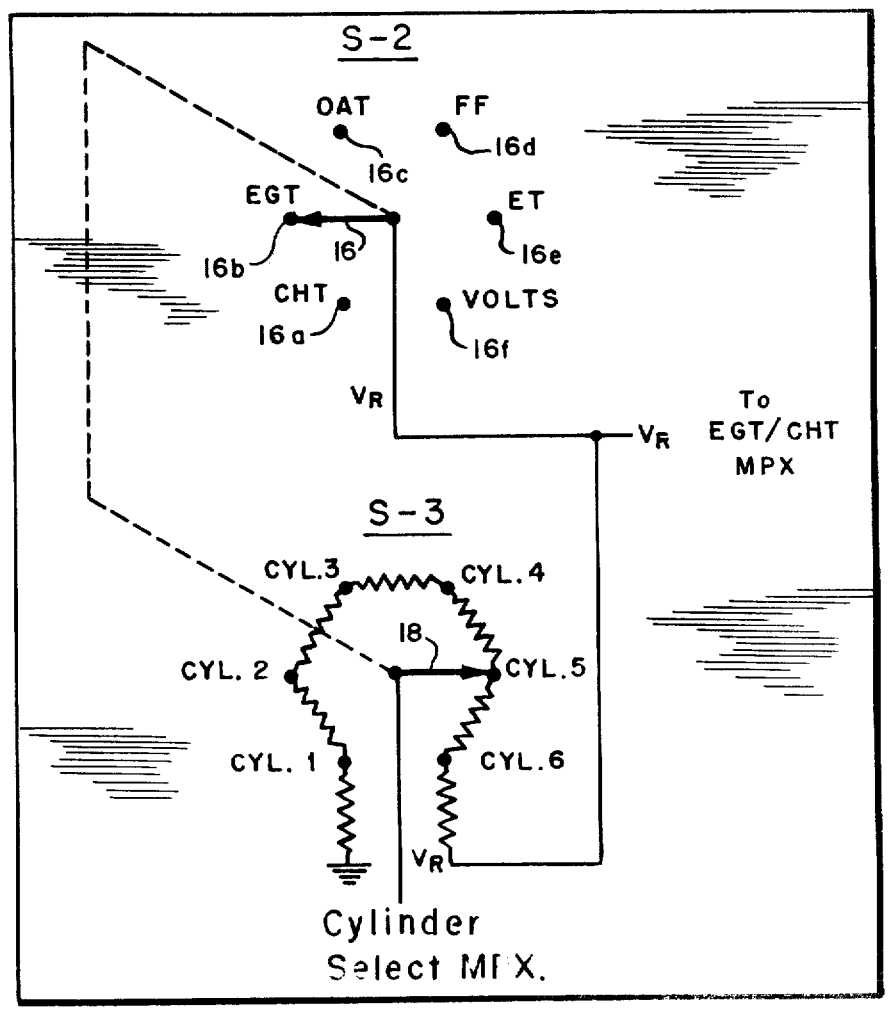

Referring now to FIGS. 2, 7 and 10 of the drawings, a sensor 40a is provided for measuring the level or quantity of fuel in the left fuel tank, a sensor 40b is provided for measuring the pressure of the fuel being delivered to the aircraft power plant, a sensor 40c is provided for measuring the pressure of the air that operates the flight instruments of the aircraft, a sensor 40d is provided for measuring the temperature of the oil in the power plant, a sensor 40f is provided for measuring the pressure of the oil in the power plant and a sensor 40g is provided for measuring the quantity of fuel remaining in the right fuel tank of the aircraft. Each of the aforesaid parameter sensors 40a through 40g generates a sensor signal voltage that varies directly with changes in the magnitude of the operating parameter being measured. The magnitude of the sensor signal voltage is usually in the order of a few hundred millivolts and must be transformed to a higher and more useful voltage for display at the panel 10. Accordingly, the sensor signal voltages generated by each of the aforesaid parameter sensors 40a through 40 are transmitted to sensor signal voltage conditioning and calibrating means 42a through 42g, respectively.

Referring for illustrative purposes to the fuel level sensor 40a for the left fuel tank, in a typical case the fuel tank may contain about 150 pounds of fuel when full. The signal sensor voltage generated by the sensor 40a may range from about 300 millivolts when the fuel tank is empty to about 600 millivolts when the fuel tank is full. In the present illustrative case, it is assumed that the fuel tank contains 100 pounds of fuel and that the sensor signal voltage generated by the sensor 40a corresponding to this amount of fuel is 500 millivolts. The sensor signal voltage (in this case, 500 millivolts) is transformed by the sensor signal voltage conditioning and calibrating means 42a to a conditioned analog signal voltage (say, 5 volts) the magnitude of which is in the same relative proportion to a predetermined reference voltage (say, 4 volts) as the actual magnitude (in the assumed case, 100 pounds of fuel) of the operating parameter being measured is to a predetermined reference magnitude (say, 50 pounds of fuel) of said operating parameter.

That is to say, the predetermined reference magnitude (in this case, 50 pounds of fuel) of the operating parameter being measured is an arbitrary value that preferably falls within the minimum and maximum magnitudes (in this case, 0 to 150 pounds of fuel) of the operating parameter, and the predetermined conditioned analog signal reference voltage (in this case, 4 volts) is an arbitrary value that preferably falls within the minimum and maximum values of the conditioned analog voltage (in the assumed case, 3 to 6 volts) produced by the voltage conditioning and calibrating means 42a. The reference sensor signal voltage corresponding to the parameter reference magnitude (50 pounds of fuel) is 400 millivolts and the conditioned analog signal preference voltage corresponding thereto is, as noted, 4 volts. The actual sensor signal voltage (in the assumed case, 500 millivolts) corresponding to the actual magnitude of the operating parameter (in the assumed case, 100 pounds of fuel) bears a definite ratio or proportion to the reference sensor signal voltage (400 millivolts) corresponding to the predetermined parameter reference magnitude (50 pounds) of the parameter being measured, and the conditioned analog signal voltage (in the assumed case, 5 volts) corresponding to the actual magnitude (100 pounds) of the parameter being measured bears the same ratio or proportion to the aforesaid conditioned analog signal reference voltage (4 volts) produced by the conditioning and calibrating means 42a.

The conditioned analog signal voltage produced by the voltage conditioning and calibrating means 42a varies directly with the sensor signal voltage generated by the sensor 40a. Thus, a continuous rise or decline in the sensor signal voltage will result in a continuous rise or decline in the conditioned analog signal voltage, the minimum and maximum values of the conditioned analog signal being the lower and upper limits of a continuous voltage gradient. The exact value of the conditioned analog signal voltage at any moment in time corresponds to the sensor signal voltage at that moment which, in turn, is determined by the actual magnitude (that is, the amount of fuel) of the operating parameter being measured.

The conditioned analog signal voltage from the conditioning and calibrating means 42a is transmitted to a continuous voltage gradient to incremental voltage gradient converter means 44a. The continuous to incremental voltage gradient converter means 44a divides the continuous voltage gradient of the conditioning analog signal voltage into a predetermined number of incrementally increasing analog signal voltage increments (say, ten approximately equal step-wise voltage increments). The magnitude of each analog signal voltage increment corresponds to a small segment of the continuous voltage gradient of the conditioned analog signal voltage produced by the conditioning and calibrating means 42a. Accordingly, the actual signal voltage from the signal voltage and calibrating means 42a is converted by the continuous to incremental voltage gradient converter means 44a to an analog signal voltage increment the magnitude of which corresponds approximately to the actual magnitude of the operating parameter being measured.

By way of example, in the assumed case when the empty fuel tank is gradually filled with fuel the conditioned analog signal voltage will rise gradually and continuously from a minimum of 3 volts to a maximum of 6 volts. The continuous to incremental voltage gradient converter means 44a divides the aforesaid continuous 3 volt voltage gradient into 10 step-wise voltage increments having the following assumed incremental voltage values: 3.0, 3.3, 3.7, 4.0, 4.3, 4.7, 5.0, 5.3, 5.7, and 6.0 volts. If the fuel tank contains 95 pounds of fuel the sensor signal voltage corresponding thereto would be 490 millivolts and the conditioned analog signal voltage corresponding thereto would be 4.9 volts. The continuous to incremental voltage gradient converter means 44a would convert this conditioned signal analog voltage to the nearest incremental voltage value which, in the assumed case, is 5.0 volts.

The analog signal voltage increment produced by the continuous to incremental voltage gradient converter means 44a is transmitted to an analog signal voltage increment indicator means 46a at the display panel 10 of the device. In the advantageous embodiment of the device described herein, the display means 46a comprises the 10-bar indicator 11a hereinbefore described. The lowest voltage increment (say, 3 volts) of the incremental voltage gradient produced by the continuous to incremental voltage gradient converter means 44a causes the lowermost horizontal light source of the 10-bar indicator to be illuminated, an intermediate voltage increment (say, 5.0 volts) causes one of the intermediate horizontal light bars to be illuminated, and the highest voltage increment (6 volts) causes the uppermost of the horizontal light bars to be illuminated, thereby providing a visual indication of the approximate magnitude of the operating parameter being measured.

In the same manner, each of the sensor signal voltages generated by the fuel pressure sensor 40b, the instrument air pressure sensor 40c, the ampere sensor 40d, the oil temperature sensor 40e, the oil pressure sensor 40f and the fuel level sensor 40g are transformed to the corresponding conditioned analog signal voltages by the sensor signal voltage conditioning and calibrating means 42b through 42g, respectively. The conditioned analog signal voltages thus produced are converted to the corresponding analog signal voltage increments by the continuous to incremental voltage gradient converter means 44b through 44g, respectively, and each of these analog signal voltage increments is transmitted to the analog signal voltage increment indicator means 46b through 46g, respectively, the analog signal voltage indicator means advantageously being the 10-bar indicators 11b through 11g previously mentioned.

The magnitude of the operating parameters measured by the sensors 40a through 40g may also be selectably displayed in numeric form by the array of alpha-numeric display units 12 at the display panel 10. A selector switch S-1 (shown best in FIGS. 1 and 10) is provided for selecting a particular one of the operating parameters to be displayed by the display units 12. The selector switch S-1 determines which one of the conditioned analog signal voltages produced by the signal voltage conditioning and calibration means 42a through 42g (FIG. 2) is to be transmitted to an analog to digital converter means 48 (FIG. 7). The analog to digital converter means 48 converts the selected conditioned analog signal to a corresponding multibit digital signal which, in turn, is transmitted to the array of numeric display units 12 where the actual magnitude of the operating parameter being measured is displayed in numeric form, as herein described.

The selector switch S-1 comprises a rotatable selector knob 14 having nine selectable positions or poles. A solid state switch (for example, a transistor) is disposed in each of the lines connecting each of the signal voltage and calibrating means 42a and 42g to the analog to digital converter means 48. The solid state switches 50a through 50g are individually connected to seven of the nine poles 14a through 14g of the knob 14 of the selector switch S-1. When the selector knob 14 is turned to the first selectable position (labeled LEDS OFF) the alpha-numeric display units 12 are not in use. When the selector knob 14 is turned to a selected one of its second through eighth selectable positions 14a through 14g, one of the solid state switches 50a through 50g is energized to permit transmission of the selected analog signal voltage to the analog to digital converter means 48. When the selector switch is turned to its ninth and last selectable position 14h, the operating parameter selected by the selector switch S-2 is displayed by the display unit 12. In the example shown in FIGS. 1 and 10 of the drawings, the knob 14 of the switch S-1 is at its position 14b which energizes the switch 50b and thereby transmits the conditioned analog signal voltage from the conditioning and calibrating means 42b to the analog to digital converter means 48. This causes the actual magnitude (20.5 psi) of the fuel pressure to be displayed by the alphanumeric display units 12.

Figure 3:
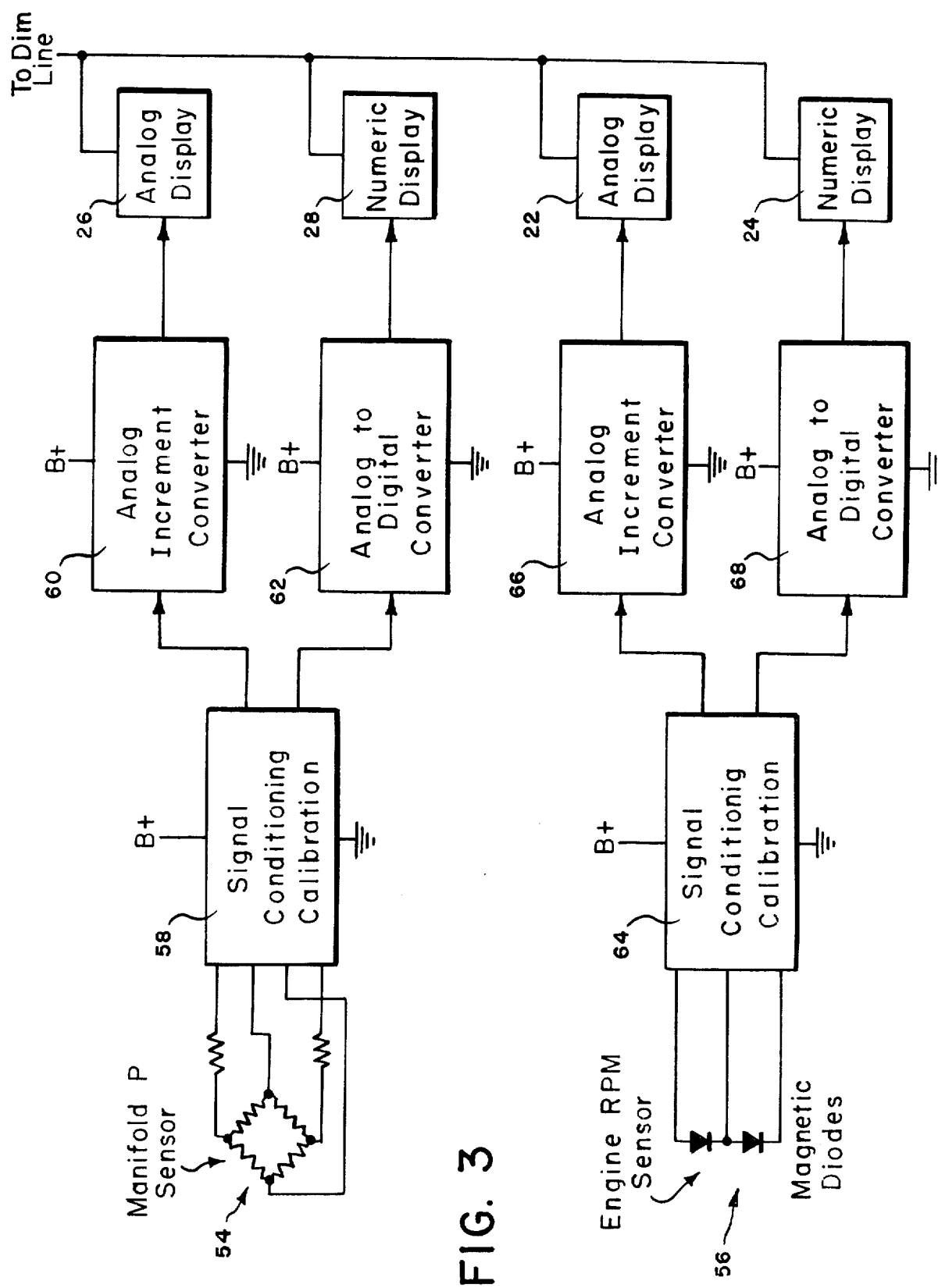

Referring now to FIG. 3 of the drawings, a sensor 54 is provided for measuring the intake manifold pressure and a sensor 56 is provided for measuring the engine speed of the aircraft power plant. The sensor signal voltage generated by the sensor 54 is transformed to a conditioned analog signal voltage by the sensor signal voltage conditioning and calibrating means 48, the conditioned analog signal voltage is transmitted to the continuous voltage gradient to incremental voltage gradient converter means 60 which converts the actual analog signal voltage to a corresponding analog signal voltage increment, and the analog signal voltage increment is transmitted to the analog signal voltage increment indicator means 26 at the display panel 10 of the device, all as hereinbefore described. The conditioned analog signal voltage from the conditioning and calibration means 58 is also transmitted to the analog to digital converter 62 which converts the analog signal to a multibit digital signal which, in turn, is transmitted to the array of alpha-numeric display units 28, as also hereinbefore described. Similarly, the sensor signal voltage generated by the engine speed sensor 56 is transformed to a conditioned analog signal voltage by the conditioning and calibrating means 64, and the conditioned analog signal is transmitted both to the continuous to incremental voltage gradient converter means 66 aand to the analog to digital converter means 68. The analog signal voltage increment from the continuous to incremental converter means 66 is transmitted to the analog signal voltage increment indicator means 22, and the multibit digital signal from the analog to digital converter 68 is transmitted to the array of alpha-numeric display units 24, as previously described.

As previously noted, when the knob 14 of the selector switch S-1 is turned to its ninth selectable position 14h the magnitude of the operating parameter selected by the selector switch S-2 will be displayed in numeric form by the display unit 12 at the panel 10. The selector switch S-2 (shown best in FIGS. 1 and 11) has six selectable position or poles 16a through 16f (labeled CHT, EGT, OAT, FF, ET and Volts, respectively). Each of the poles 15a – 16f are individually connected to one of the solid state switches 70a through 70f (FIGS. 4, 5 and 8) disposed in the lines transmitting the conditioned analog signal voltages corresponding to the various operating parameter being monitored to the analog to digital converter means 48 (FIG. 7). Rotation of the knob 16 of the selector switch S-2 to a particular one of the selectable positions of the switch will energize the solid state switch connected thereto, thereby allowing the conditioned analog signal corresponding to the selected operating parameter to be transmitted to the analog to digital converter 48 and thence to the alpha-numeric display unit 12. In the example shown in FIGS. 1 and 11 of the drawings, the knob 16 of the switch S-2 is at its position GHT which energizes the switch 70b. If the knob 14 of the switch S-1 is now turned to its position 14h, the actual magnitude (eg. 685°C.) of the exhaust gas temperature will be displayed by the alpha-numeric display units 12. Moreover, the selector switch S-3 may be utilized to select a particular one of the six cylinders of the engine the exhaust gas temperature of which is to be displayed by the display means 12.

Figure 4:
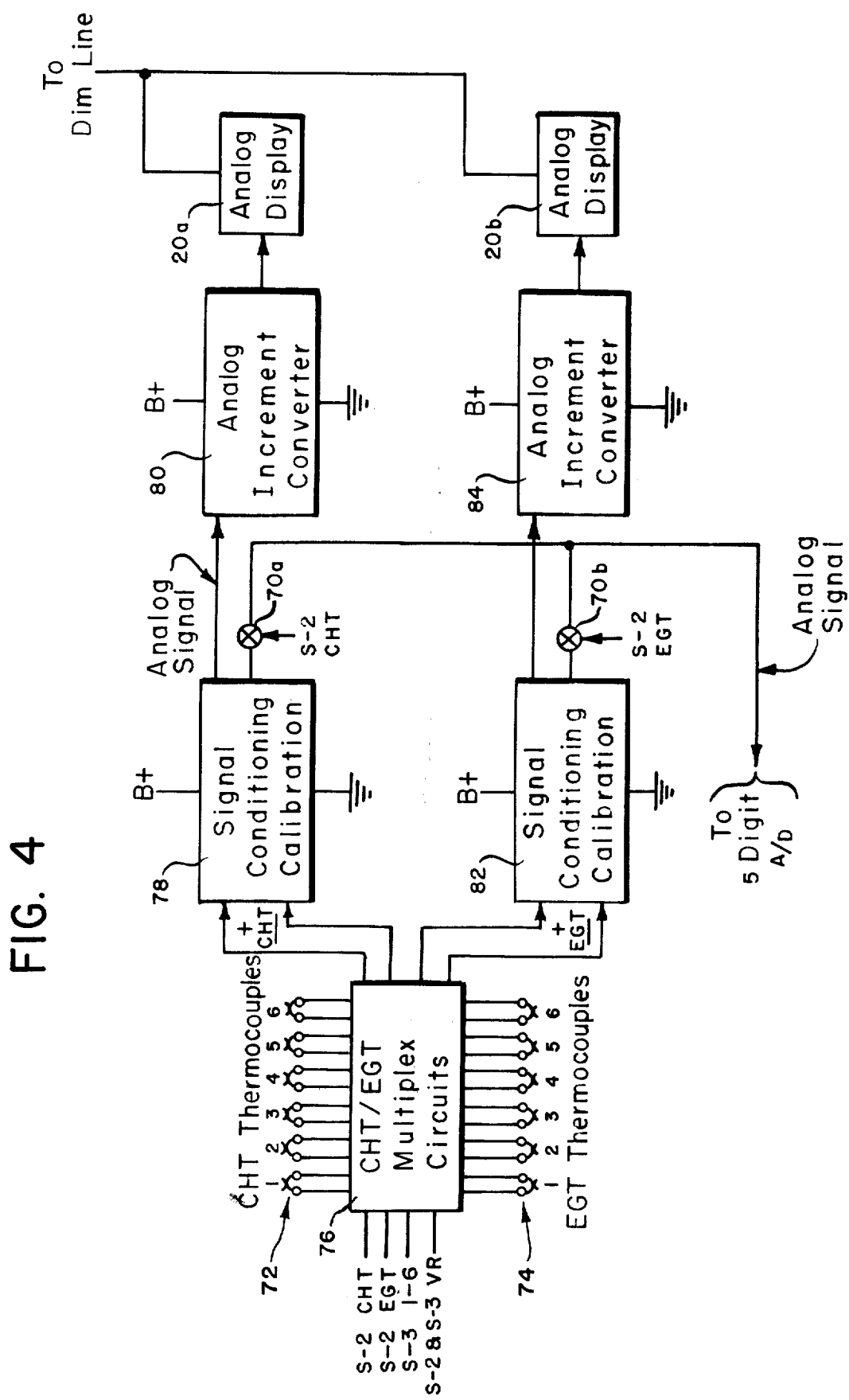

Referring now to FIG. 4 of the drawings, a plurality of sensors 72 (labeled CHT thermocouples 1–6 in FIG. 4) are provided for measuring the temperature of each of the six cylinder heads of the aircraft engine, and a plurality of sensors 74 (labeled EGT thermocouples 1–6) are provided for measuring the temperature of the exhaust gas of each of the six cylinders of the engine. Each of the sensors 72 (CHT thermocouples 1–6) generates a CHT sensor signal voltage that is transmitted to the cylinder head temperature and exhaust gas temperature multiplex means 76. The position of the selector knob 18 of the switch S-3 determines which one of these CHT sensor signal voltages is transmitted to the sensor signal voltage conditioning and calibrating means 78. The signal voltage conditioning and calibrating means 78 transforms the selected CHT sensor signal voltage to a conditioned analog signal voltage which, in turn, is converted by the continuous to incremental voltage gradient converter means 80 to an analog signal voltage increment the magnitude of which corresponds approximately to the actual magnitude of the cylinder head temperature being measured. The analog signal voltage increment is transmitted to the voltage increment indicator means 20a which visually indicates the approximate magnitude of the cylinder head temperature being measured. The conditioned CHT analog signal voltage produced by the signal voltage conditioning and calibrating means 78 is also transmitted to the analog to digital signal converter means 48 and thence to the alpha-numeric display units 12 when the knob 16 of switch S-2 is at its position 16a and the knob 14 of the switch S-1 is at its position 14h. Similarly, each of the sensors 73 (EGT thermocouples 1–6) generates a EGT sensor signal voltage that is also transmitted to the cylinder head temperature and exhaust gas temperature multiplex means 76. The position of the selector knob 18 of the switch S-3 determines which one of these EGT sensor signal voltages is transmitted to the sensor signal voltage conditioning and calibrating means 82. The signal voltage conditioning and calibrating means, 82, transforms the selected EGT sensor signal voltage to a conditioned analog signal voltage, the continuous to incremental voltage gradient converter means 84 converts the conditioned analog signal voltage to an analog signal voltage increment the magnitude of which corresponds approximately to the actual magnitude of the exhaust gas temperature being measured, and the voltage increment indicator means 20b visually indicates the approximate magnitude of the exhaust gas temperature being measured, all as previously described. The conditioned EGT analog signal voltage produced by the signal voltage conditioning and calibrating means 82 is also transmitted to the analog to digital signal converter means 48 and thence to the alpha-numeric display units 12 when the knob 16 of switch S-2 is at its position 16b and the knob 14 of the switch S-1 is at its position 14h.

Figure 5:
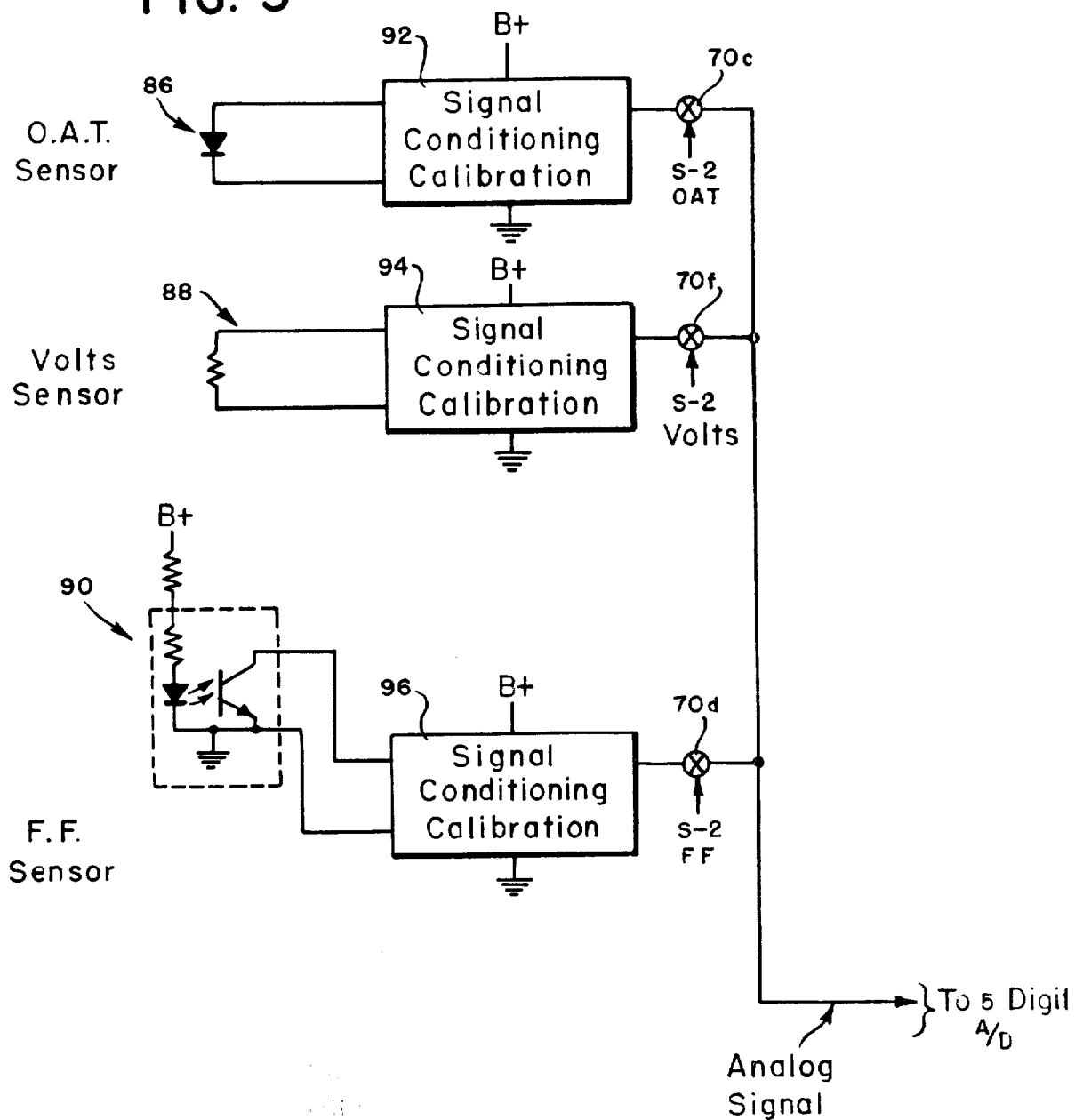

Referring now to FIG. 5, the sensor 86 generates a sensor signal voltage that is a measure of the outside air temperature, the sensor 88 measures the voltage of the aircraft electrical system, and the sensor 90 measures the rate of fuel flow to the aircraft engine. The sensor signal voltages generated by the sensors 86, 88 and 90 are transformed by the signal voltage conditioning and calibrating means 92, 94 and 96, respectively, into corresponding conditioned analog signal voltages. When the knob 14 of the selector switch S-1 is at its position 14h, and when the knob 16 of the selector switch S-2 is at its position 16c, 16d or 16f, the position of the knob 16 will determine which one of the solid state switches 70c, 70d, or 70f will be energized and, therefore, which one of the selected operating parameters being monitored (that is, the outside air temperature, the voltage or the fuel flow) will be displayed by the alpha-numeric display units 12.

Figure 6:
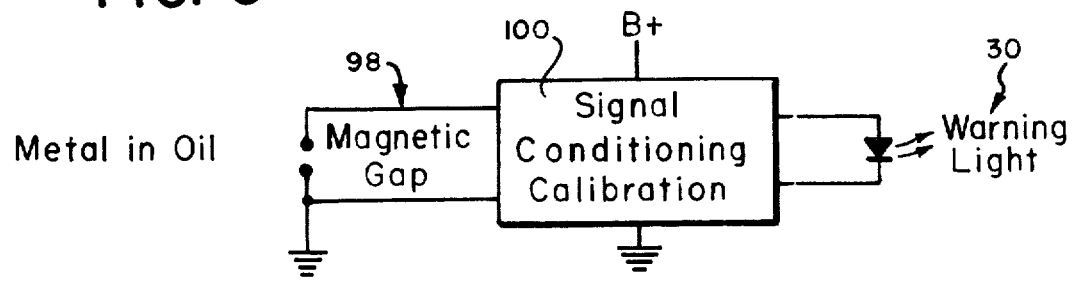

Referring now to FIG. 6, the sensor 98 is adapted to detect the presence of metal in the aircraft engine oil, and when any such metal is detected by the sensor a signal voltage is generated that is transmitted to the signal voltage conditioning and calibrating means 100. The sensor signal voltage conditioning and calibrating means 100 transforms the sensor signal voltage to a conditioned signal voltage which causes the visual signal light 30 at the panel 10 to be illuminated. The conditioned signal voltage produced by the conditioning calibrating means 100 may also cause an audible alarm signal to sound.

Figure 8:
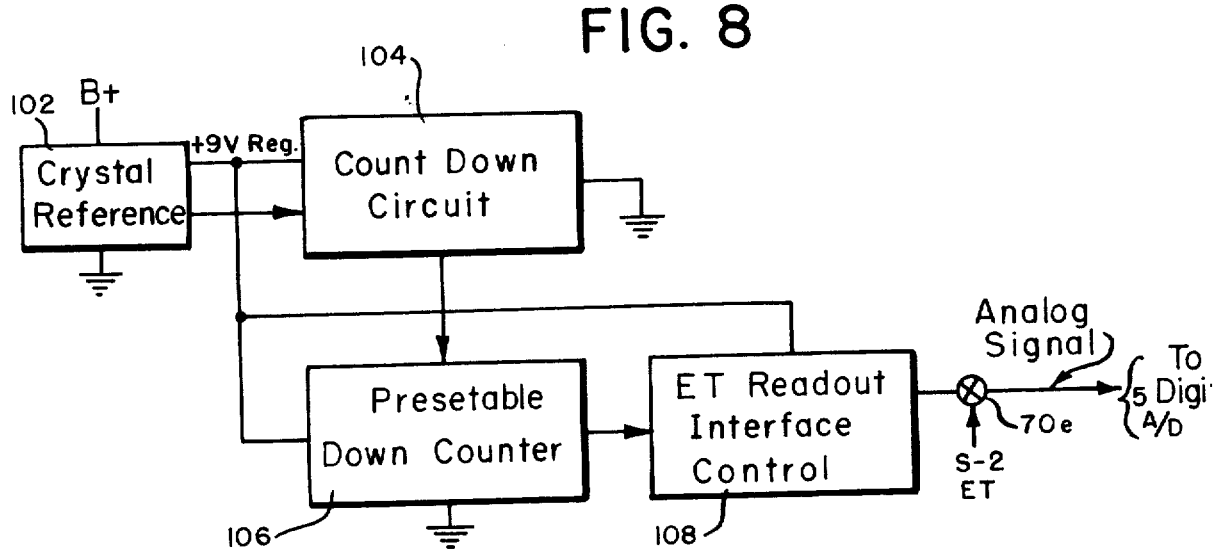

Referring now to FIG. 8, means are provided for measuring and displaying the elapsed time from the start of or from selected point in the flight of the aircraft. In the embodiment shown in the drawings, a crystal controlled oscillator 102 generates a reference frequency of, say, 26,000 Hz that is divided into conventional time units (seconds, minutes and hours) by the count down circuit 104. Means are also provided (the resettable down counter 106 and the elapsed time readout control 108) for initiating and transmitting an elapsed time count down. When the knob 16 of the switch S-2 is at its position 16e the solid state switch 70e is closed so that, when the knob 14 of the switch S-1 is at its position 14h, the elapsed time will be displayed by the alpha-numeric display units 12 at the panel 10.

Figure 9:
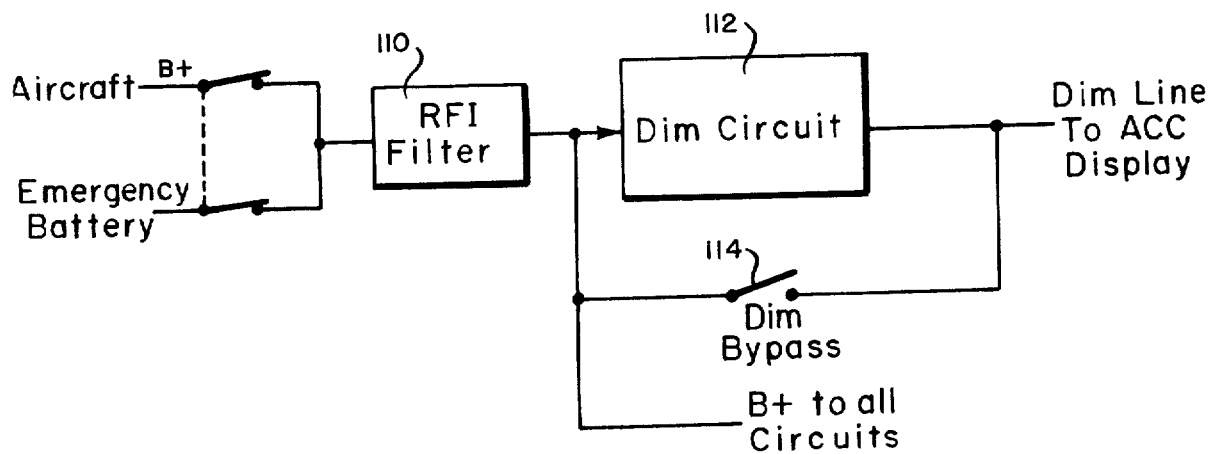

Referring now to FIG. 9, electrical power for the device is provided by the aircraft electrical system or, in case of emergency, by an emergency battery. The radio frequency interference filter 110 and the dim circuit 112 are entirely conventional. The dim circuit 112 and the dim by-pass switch 114 are controlled by the control knob 32 at the panel 10.

We claim:

1. Device for monitoring the operating parameters of a dynamic system the magnitude of which operating parameters may vary between predetermined minimum and maximum measured values which comprises:

a plurality of sensors each one of which is adapted to measure the magnitude of a specific operating parameter and to generate a sensor signal voltage that varies directly with the magnitude of the operating parameter being measured, sensor signal voltage conditioning and calibrating means electrically connected to each sensor, said means transforming the sensor signal voltage to a conditioned analog signal voltage the magnitude of which is in the same relative proportion to a predetermined reference voltage as the actual magnitude of the operating parameter being measured is to a predetermined reference magnitude of said operating parameter, continuous voltage gradient to incremental voltage gradient converter means electrically connected to each signal voltage conditioning and calibrating means, said converter means dividing the continuous voltage gradient of the conditioned analog signal voltage into a predetermined number of incrementally increasing analog signal voltage increments, whereby the actual signal voltage from said signal voltage conditioning and calibrating means is converted to an analog signal voltage increment the magnitude of which corresponds approximately to the actual magnitude of the operating parameter being measured, analog signal voltage increment indicator means electrically connected to the cntinuous to incremental voltage gradient converter means, said indicator means having an electrically energized visual display means corresponding to each of said predetermined analog signal voltage increments, said visual display means visually indicating the analog signal increment that corresponds to the actual magnitude of the operating parameter being measured, manually operated selector switch means also electrically connected to each of the signal voltage conditioning and calibrating means, said selector switch being adapted to select the conditioned analog signal from a particular one of the signal conditioning and calibrating means and to transmit said selected signal to an analog to digital converter means, analog to digital converter means electrically connected to said selector switch means, said converter means converting the selected conditioned analog signal to a corresponding multibit digita signal, and a first array of alpha-numeric visual display units electrically connected to said analog to digital converter means, said display units displaying in numeric form the actual magnitude of the particular operating parameter that corresponds to the particular conditioned analog signal selected by said selector switch means.

2. The device according to claim 1 in which a sensor is provided for measuring the magnitude of an additional operating parameter, in which the sensor signal voltage generated by said sensor is transmitted to a sensor signal voltage conditioning and calibrating means, in which the resulting conditioned analog signal voltage is transmitted directly to a continuous voltage gradient to incremental voltage gradient converter means and thence to an analog signal voltage increment indicator means, and in which said conditioned analog signal is also transmitted directly to an analog to digital converter means and thence to a second array of alpha-numeric visual display units.

3. The device according to claim 1 in which a sensor is provided for measuring the magnitude of an additional operating parameter, in which the sensor signal voltage generated by said sensor is transmitted to a sensor signal voltage conditioning and calibrating means, and in which the resulting conditioned analog signal voltage is transmitted to a visual signal light that is illuminated when said signal voltage reaches a predetermined value.

4. The device according to claim 1 in which a sensor is provided for measuring the magnitude of an additional operating parameter, in which the sensor signal voltage generating by said sensor is transmitted to a sensor signal voltage conditioning and calibrating means, in which manually operated selector switch means are electrically connected to said signal voltage conditioning and calibrating means to prevent transmission of the resulting conditioned analog signal voltage when said switch means is open, and in which said conditioned analog signal voltage is transmitted to the analog to digital converter means and thence to the first array of alpha-numeric visual display units when said switch means is closed.

5. The device according to claim claim 1 in which the dynamic system being monitored is an aircraft having an internal combustion engine power plant, fuel tanks containing fuel for said power plant, a source of air for air powered flight instruments, and a rechargeable battery powered electrical system, in which a sensor is provided for measuring the pressure of the fuel being delivered to the aircraft power plant, in which a sensor is provided for measuring the pressure of the air that operates the flight instruments of the aircraft, in which a sensor is provided for measuring the amperes being discharged and charged by the aircraft electrical system, in which a sensor is provided for measuring the temperature of the oil in the power plant and in which a sensor is provided for measuring the pressure of the oil in the power plant.

6. The device according to claim 5 in which a sensor is provided for measuring the magnitude of the speed of the aircraft power plant (in revolutions per minute), in which the sensor signal voltage generated by said sensor is transmitted to a sensor signal voltage conditioning and calibrating means, in which the resulting conditioned analog signal voltage is transmitted directly to a continuous voltage gradient to incremental voltage gradient converter means and thence to an analog signal voltage increment indicator means and in which said conditioned analog signal is also transmitted directly to an analog to digital converter means and thence to a second array of alpha numeric visual display units which displays in numeric form the speed (rpm) of the power plant.

7. The device according to claim 5 in which a sensor is provided for measuring the magnitude of the intake manifold pressure of the power plant, in which the sensor signal voltage generated by said sensor is transmitted to a sensor signal voltage conditioning and calibrating means, in which the resulting conditioned analog signal voltage is transmitted directly to a continuous voltage gradient ot incremental voltage gradient converter means and thence to an analog signal voltage increment indicator means, and in which said conditioned analog signal is also transmitted directly to an analog to digital converter means and thence to a second array of alpha numeric visual display unit which displays in numeric form the manifold pressure.

8. The device according to claim 5 in which a sensor is provided for measuring the rate of flow of fuel being delivered to the aircraft power plant, in which the sensor signal voltage generating by said sensor is transmitted to a sensor signal voltage conditioning and calibrating means, in which a second manually operated selector switch means is electrically connected to said signal voltage conditioning and calibrating means to prevent transmission of the resulting conditioned analog signal voltage when said switch means is open, and in which said conditioned analog signal voltage is transmitted to the analog to digital converter means and thence to the first array of alpha-numeric visual display units when said switch means is closed.

9. The device according to claim 5 in which a sensor is provided for measuring the voltage of the electrical system of the aircraft, in which the sensor signal voltage generating by said sensor is transmitted to a sensor signal voltage generating by said sensor is transmitted to a sensor signal voltage conditioning and ccalibrating means, in which a second manually operated selector switch means is electrically connected to said signal voltage conditioning and calibrating means to prevent transmission of the resulting conditioned analog signal voltage when said switch means is open, and in which said conditioned analog signal voltage is transmitted to the analog to digital converter means and thence to the first array of alpha-numeric visual display units when said switch means is closed.

10. The device according to claim 5 in which a sensor is provided for measuring the temperature at the head of one cylinder of the aircraft power plant, in which the sensor signal voltage generating by said sensor is transmitted to a sensor signal voltage conditioning and calibrating means, in which selector switch means are electrically connected to said signal voltage conditioning and calibrating means to prevent transmission of the resulting conditioned analog signal voltage when said switch means is open, and in which said conditioned analog signal voltage is transmitted to the analog to digital converter means and thence to the first array of alpha-numeric visual display units when said switch means is closed.

11. The device according to claim 5 in which a sensor is provided for measuring the temperature at the head of each cylinder of the aircraft power plant, in which selector switch means are electrically connected to each of said sensors for selecting the sensor signal voltage generated by the particular sensor associated with a particular selected cylinder head, in which the sensor signal voltage generating by said selected sensor is transmitted to a sensor signal voltage conditioning and calibrating means, in which selector switch means are electrically connected to said signal voltage conditioning and calibrating means to prevent transmission of the resulting conditioned analog signal voltage when said switch means is open, and in which said conditioned analog signal voltage is transmitted to the analog to digital converter means and thence to the first array of alpha-numeric visual display units when said switch means is closed.

12. The device according to claim 5 in which a sensor is provided for measuring the temperature of the exhaust gases from one cylinder of the aircraft power plant, in which the sensor signal voltage generating by said sensor is transmitted to a sensor signal voltage conditioning and calibrating means, in which selector switch means are electrically connected to said signal voltage conditioning and calibrating means to prevent transmission of the resulting conditioned analog signal voltage when said switch means is open, and in which said conditioned analog signal voltage is transmitted to the analog to digital converter means and thence to the first array of alpha-numeric visual display units when said switch means is closed.

13. The device according to claim 5 in which a sensor is provided for measuring the temperature of the exhaust gases from each cylinder of the aircraft power plant, selector switch means electrically connected to each of said sensors for selecting the sensor signal voltage generated by the particular sensor associated with a particular selected cylinder exhaust, in which the sensor signal voltage generating by said selected sensor is transmitted to a sensor signal voltage conditioning and calibrating means, in which selector switch means are electrically connected to said signal voltage conditioning and calibrating means to prevent transmission of the resulting conditioned analog signal voltage when said switch means is open, and in which said conditioned analog signal voltage is transmitted to the analog to digital converter means and thence to the first array of alpha-numeric visual display units when said switch means is closed.

* * * * *